(No Model.) 2 Sheets—Sheet 1.
A. SCHLEGEL & H. MAYER.
DEVICE FOR PROTECTING UNBURNED BRICK.
No. 500,620. Patented July 4, 1893.
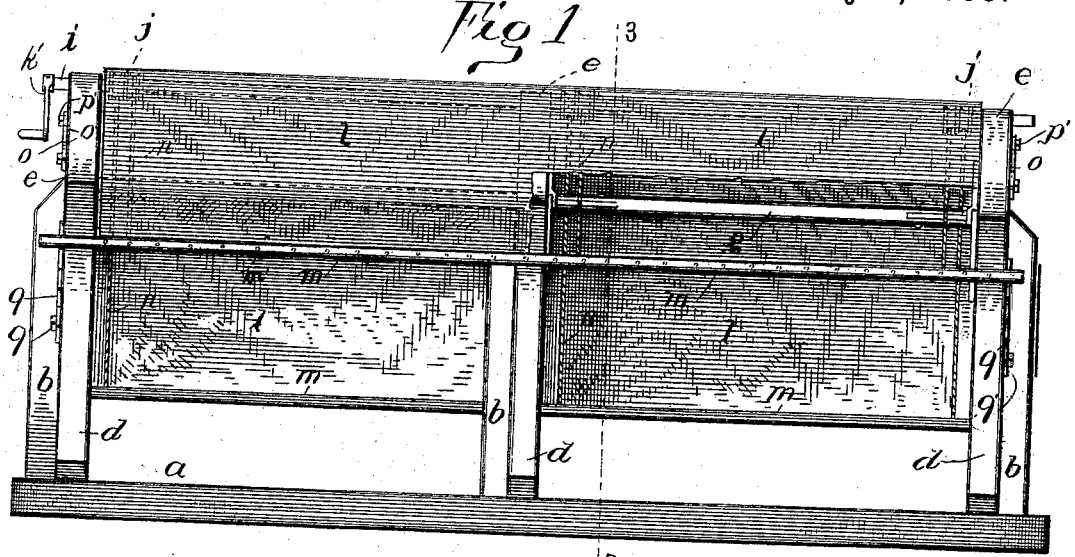
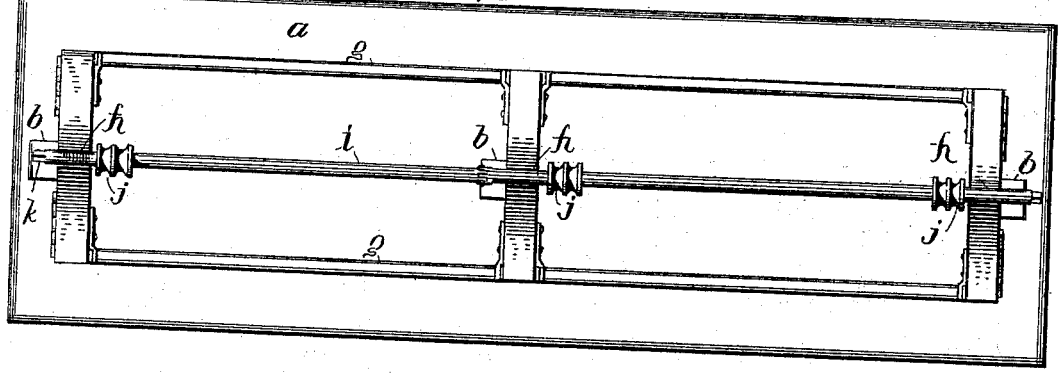
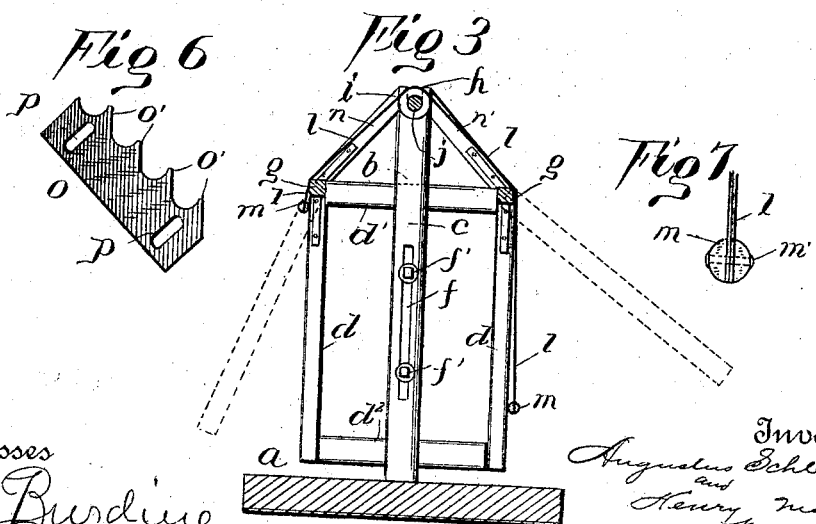
Witnesses
Inventors
Augustus Schlegel
Henry Mayer
Attorney (No Model.) 2 Sheets—Sheet 2.
A. SCHLEGEL & H. MAYER.
DEVICE FOR PROTECTING UNBURNED BRICK.
No. 500,620. Patented July 4, 1893.
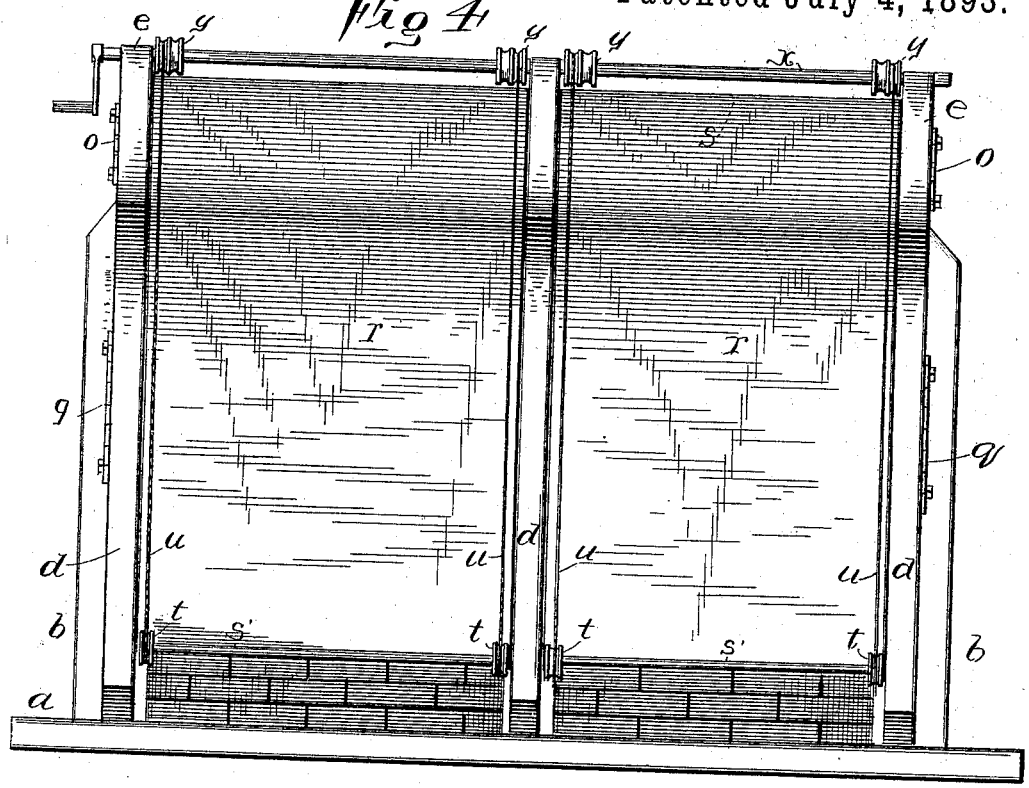
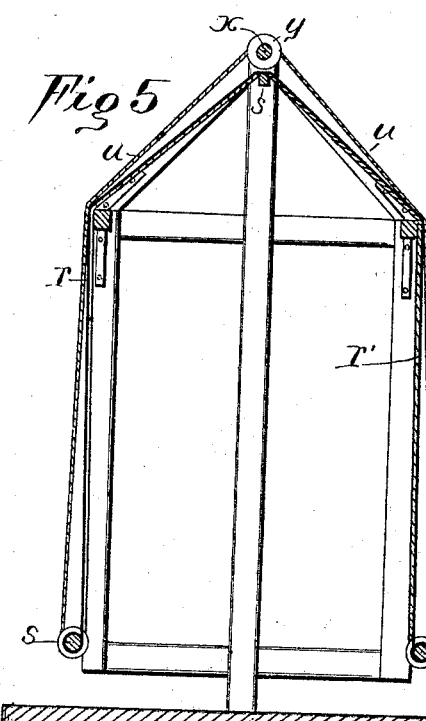
Witnesses:
C. C. Burdine
J. B. Avens
Inventors
Augustus Schlegel
Henry Mayer
per
R. L. Goss.
Their Attorney

UNITED STATES PATENT OFFICE.

AUGUSTUS SCHLEGEL AND HENRY MAYER, OF DECATUR, INDIANA.

DEVICE FOR PROTECTING UNBURNED BRICK.

SPECIFICATION forming part of Letters Patent No. 500,620, dated July 4, 1893.

Application filed September 1, 1891. Renewed December 8, 1892. Serial No. 454,447. (No model.)

*To all whom it may concern:*

Be it known that we, AUGUSTUS SCHLEGEL and HENRY MAYER, citizens of the United States, residing at Decatur, in the county of Adams and State of Indiana, have invented certain new and useful Improvements in Devices for Protecting Unburned Brick; and we do hereby declare the following to be a full, clear, and exact description of the invention, such as will enable others skilled in the art to which it appertains to make and use the same.

Our invention relates to an improved apparatus for protecting unburned bricks from rain, its object being to produce a cover or protector which can be shifted from one side to the other of the supporting frames so as to protect the bricks on either side or on top.

To this end our invention consists in certain features of novelty to be hereinafter described and then particularized in the claims.

In the accompanying drawings, Figure 1 is a side view with the awning shifted. Fig. 2 is a top view, with the awning removed. Fig. 3 is a transverse section on line III—III, Fig. 1. Fig. 4 is a side view of a modification, and Fig. 5 is a transverse section thereof. Fig. 6 is an enlarged detail view of the hook-section. Fig. 7 is an enlarged sectional view of the weight-pole showing our method of clamping the pole to the awning.

The floor or base of the apparatus is indicated by $a$, and the uprights for supporting the transversely arranged vertical frames by $b$. The uprights $b$ are placed in line, and spaced at suitable distances apart.

The vertical frames, one of which is secured to each upright, are each composed of vertical central bars $c$, parallel side bars $d$, cross bars $d'$ and $d^2$ at top and bottom, and inclined top bars $e$, extending upwardly from the upper ends of the side bars $d$, and joining in an angle at the top of the central bar $c$ which extends above the cross top bar $d'$, thus forming a reverse V-shaped top to each frame. The central bars of each frame are provided with vertical slots $f$, through which pass the screws $f'$ that take into the uprights $b$ and adjustably support the frames at different heights. These frames are connected at their upper corners by means of tie-rods $g$. At the tops of the frames are opening bearings $h$ in which a longitudinally extended shaft $i$ journals. Double spools $j$ are fixed on the shaft $i$, contiguous to each frame. The shaft has a squared end $k$, to receive the socket of a crank $k'$, for turning the shaft. An awning $l$ is laid over the shaft $i$ and tie-rods $g$, so as to hang on either or both sides of the frames. The awning has a weight-pole $m$ at each end, on each side of and extending beyond the ends of the frames and which may be made out of any suitable material, either round or square. The poles are made in sections, the awning being clamped and held between them by means of set-screws $m'$ which pass therethrough. Oppositely wound ropes or cords $n, n'$, are secured to the respective sections of each double spool $j$, ropes $n$ being secured to one of the poles $m$ on one side and ropes $n'$ to the other pole $m$ on the other side of the awning $l$, thus making the awning shiftable.

Hook sections composed of plates $o$, and having upwardly projecting spaced hooks $o'$, and provided with transverse slots $p$ are secured to the inclined top-bars $e$ by means of screws $p'$ that pass through slots $p$ and take into the bars $e$. When the hook sections are raised they are held up by tightening the screws $p'$, and when the latter are loosened the sections fall into inoperative position by reason of their own weight. Similar hook-sections $q$ are secured to the side bars $d$, by set-screws $q'$.

The apparatus is used by placing the hacks of unburned bricks under the awning $l$, and when rain, sleet, snow, &c., come from one side or the other the awning is lowered on that side by shifting it, which is accomplished by turning the shaft $i$ in the proper direction.

The awning $l$ is held in position by means of the proper hooks of the hook section being brought into engagement with the projecting ends of the poles $m$, and this is accomplished by drawing out and securing the hook sections to adjusted position.

In the modification, shown in Figs. 4 and 5, there are awnings $r, r'$ on each side of the frames, hung from the longitudinal tie-rod $s$ under the shaft $x$ at the top of the frames. At each end of the poles $s', s'$ of the awning, are pulleys $t, t$, around which the cords, chains or ropes $u, u$ are wound in one direction, whereas the awnings are attached to the poles $s', s'$, so as to be wound thereon in the opposite direction. The cords, chains or ropes may be so attached to the double top pulleys $y$ as to be wound thereon in either direction, depending upon whether the awnings are to be let down or rolled up on both sides of the frames, or let down only on one side. The remaining parts, shown in Figs. 4 and 5, are the same as in the other figures.

The frames can be made of wood or iron, as desired, and the awning of any suitable kind or material, such as canvas, rubber, oil-cloth, &c. The side bars $d$ are hinged to the top bars $e$, to enable the sides to be lifted, so that workmen can readily pass under.

Having thus described our invention, what we claim is—

1. In a device for protecting unburned brick, the frames in combination with awnings having poles, the ends of which poles engage movable hook sections, as specified.

2. In a device for protecting unburned bricks from rain, the combination of the frames, the tie-rods, the awning or awnings hanging over the same at the sides of the upper ends of the frames, the operating shaft, and ropes, chains, or cords connected with the awning or awnings and operated by said shaft, substantially as set forth.

3. In a device for protecting unburned bricks from rain, the combination of the frames having V-shaped tops, the tie-rods, the awning or awnings hanging over the same at the sides of the V-shaped tops of the frames, the operating shaft, and ropes, chains or cords connected with the awning or awnings and operated by said shaft, substantially as set forth.

4. In a device for protecting unburned brick, the combination of the frames, a shaft provided with double pulleys, awning or awnings, and ropes connected to the awnings, and winding in opposite directions upon the pulleys, whereby the awning is raised upon one side of the frame while being lowered on the other, in the manner set forth.

5. In a device for protecting unburned bricks from the rain, the combination of the frames, the awning having extended poles, a shaft provided with pulleys, movable hook-sections, with the hooks of which the extended poles engage, substantially as and for the purpose set forth.

In testimony whereof we affix our signatures in presence of two witnesses.

AUGUSTUS SCHLEGEL.
HENRY MAYER.

Witnesses:
J. E. ELLSWORTH,
COLLINS BUSHNELL.